Nov. 3, 1964 P. F. GIRARD 3,155,341
CONVERTIPLANE
Filed April 5, 1963 4 Sheets-Sheet 1

INVENTOR.
PETER F. GIRARD
BY Knox & Knox

Nov. 3, 1964    P. F. GIRARD    3,155,341
CONVERTIPLANE

Filed April 5, 1963    4 Sheets-Sheet 2

INVENTOR.
PETER F. GIRARD
BY Knox & Knox

Nov. 3, 1964   P. F. GIRARD   3,155,341
CONVERTIPLANE
Filed April 5, 1963                          4 Sheets-Sheet 3
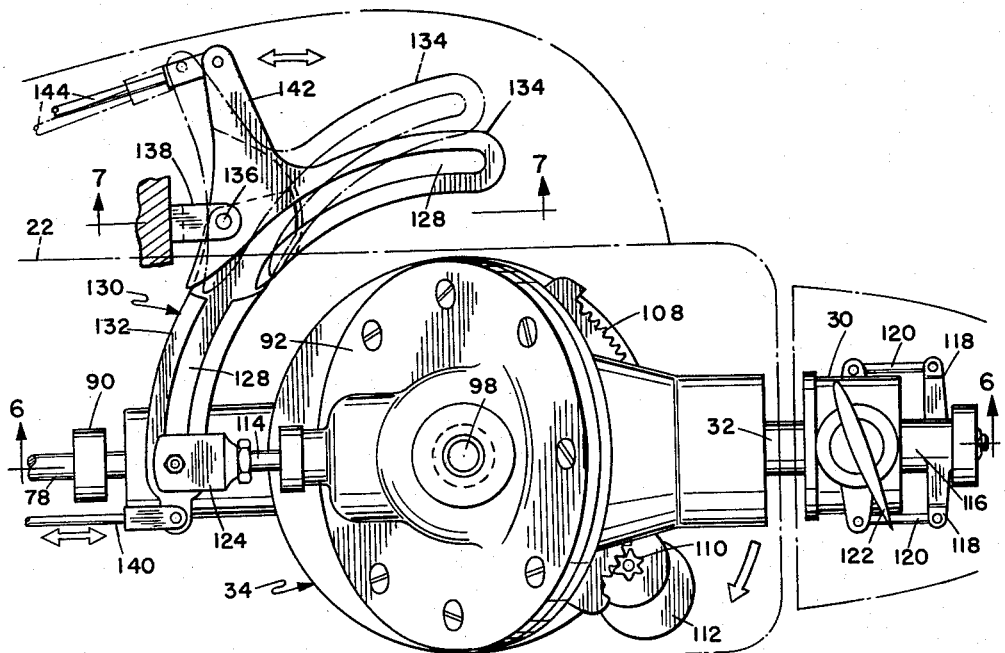
Fig. 5
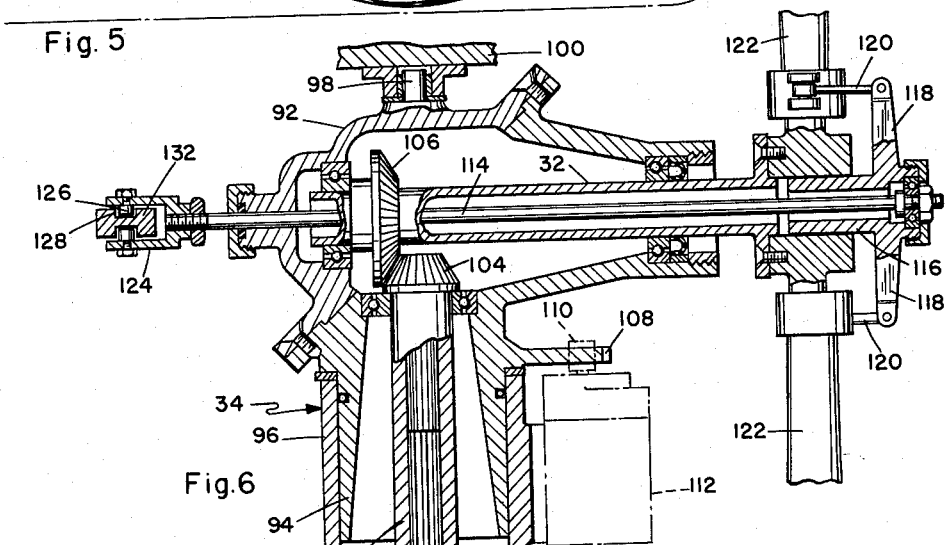
Fig. 6
INVENTOR.
PETER F. GIRARD
BY
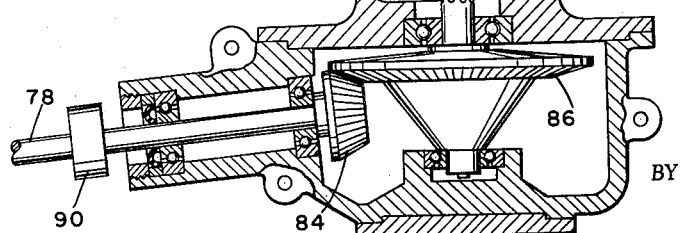

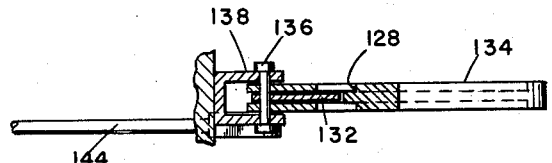
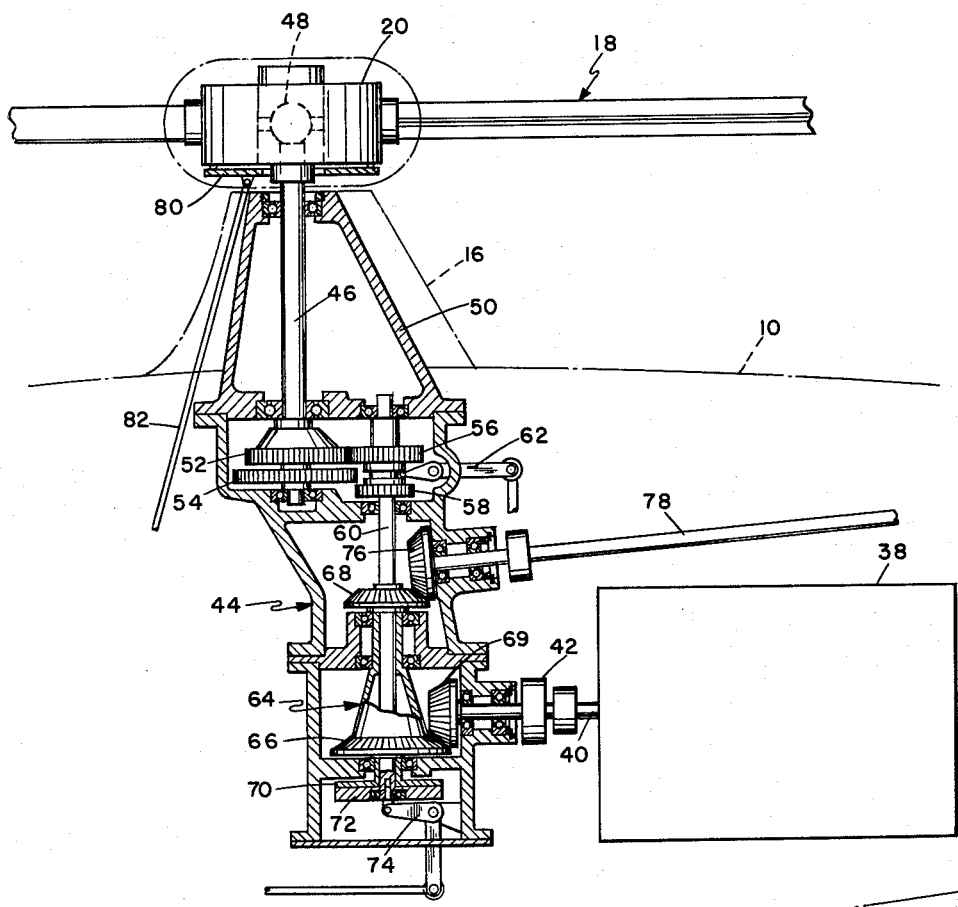
Fig. 7
Fig. 8
INVENTOR.
PETER F. GIRARD
BY
Knox & Knox 3,155,341
CONVERTIPLANE
Peter F. Girard, San Diego, Calif., assignor to The Ryan Aeronautical Co., San Diego, Calif.
Filed Apr. 5, 1963, Ser. No. 271,013
7 Claims. (Cl. 244—7)

This invention relates generally to aircraft and more specifically to a convertiplane.

One general configuration of convertiplane utilizes a large driven rotor to provide lift during vertical flight and at low speeds, as at take-off and landing. In forward flight thrust is provided by a rearward thrusting propeller, the main rotor freewheeling in the manner of an autogiro and providing lift, often in combination with fixed wings. The freewheeling or auto-rotating rotor has considerable induced drag and, at certain speeds, may develop vibration due to tip stalling of the rotor blades. By eliminating the necessity for the rotor to lift in forward flight and by reducing the drag of the rotor, power requirements are reduced and forward speed can be increased.

The primary object of this invention is to provide a convertiplane wherein the primary lifting rotor is driven during forward flight at such a speed that drag is minimized, the rotor being maintained in a position at which which lift is virtually zero, or, in other words, the rotor is unloaded during forward flight.

Another object of this invention is to provide a convertiplane wherein the primary rotor is coupled with a rear mounted propulsion propeller which provides thrust for forward flight and can also be swung to one side to act as an anti-torque rotor when the primary rotor is lifting.

Another object of this invention is to provide a convertiplane wherein the rear mounted propulsion propeller is coupled to the conventional aircraft rudder for yaw control in vertical and low speed flight, and partially through transition between vertical and forward flight, but is automatically decoupled from the rudder in forward flight.

A further object of this invention is to provide a convertiplane wherein the coupling between the propulsion propeller and the lifting rotor is a safety factor in the event of power failure, since the windmilling propeller can drive the primary rotor sufficiently to retard the rate of descent to a safe degree.

With these and other objects in view, this invention consists in the novel construction, combination and arrangement of elements and portions, as hereinafter described in the specification, pointed out in the claims and illustrated in the drawings which form a material part of this disclosure, and in which:

FIGURE 5 is an enlarged top plan view of the rear propeller drive and control system;

FIGURE 6 is a sectional view taken on line 6—6 of FIGURE 5;

FIGURE 7 is a sectional view taken on line 7—7 of FIGURE 5; and

FIGURE 8 is an enlarged sectional view of the primary drive system, as taken on line 8—8 of FIGURE 2.

Similar characters of reference indicate similar or identical elements and portions throughout the specification and throughout the views of the drawing.

General Construction

Figure 1:
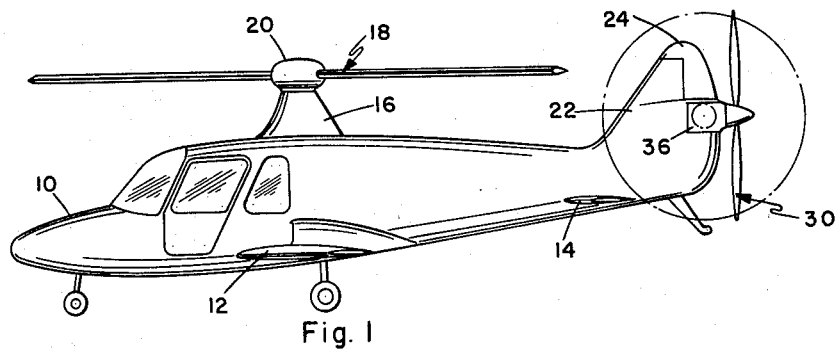
FIGURE 1 is a side elevation view of the convertiplane.
Figure 2:
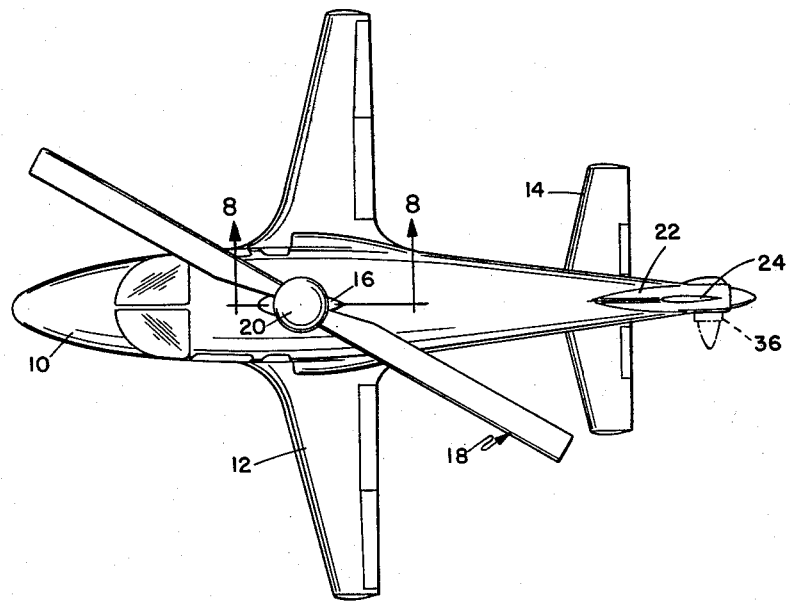
FIGURE 2 is a top plan view thereof.

The convertiplane illustrated in FIGURES 1–4 is an example of the type of design applicable to the present propulsion system, but is not to be considered limiting in any way. The aircraft has a fuselage 10 with suitable accommodations for occupants and cargo, with a fixed wing structure 12 of any suitable character and a horizontal tail 14. Conventional aerodynamic control surface may be used, with the usual actuating means. The wing 12 may be small since the lift derived therefrom is required only during forward or cruising flight, the usual excess area required for lift at take-off or landing not being necessary. Above the fuselage 10 is a pylon 16 on which is mounted a primary rotor 18 having a hub 20. This rotor may be provided with cyclic and collective pitch control means with any suitable type of blade attachment as used in conventional helicopters, many suitable mechanisms being well known. The specific mechanism and degree of control are not critical to the present disclosure.

At the rear end of fuselage 10 is a vertical fin 22 having a movable rudder 24 actuated by a horn 26 and the usual control cables 28, or similar means. Mounted on the fin 22 is a propeller 30 having a shaft 32 which extends from a drive unit 34 within the fin. In one position the axis of shaft 32 is parallel to the longitudinal axis of the aircraft, so that propeller 30 provides forward propulsive thrust. The propeller 30 is rotatable in a housing 36 to swing to one side with the axis of shaft 32 laterally perpendicular to the aircraft longitudinal axis. In this position the propeller acts as an anti-torque rotor to counteract the torque of primary rotor 18, as hereinafter described in detail.

Primary Drive System

Within the fuselage 10 is an engine 38 of any suitable type, having a drive shaft 40 connected through a conventional clutch 42 to a main gear box generally indicated at 44, as illustrated in FIGURE 8. The rotor 18 has a shaft 46 connected thereto by a universal coupling 48, the arrangement being well known in helicopter art. Shaft 46 is supported in a bearing member 50 within pylon 16 and carries at its lower end a pair of axially spaced gears 52 and 54 of different sizes. These gears are engaged selectively by transfer gears 56 and 58 slidable on and rotatable with a transfer shaft 60, as by a splined connection, the transfer gears being moved by a simple gear shift linkage 62 to obtain two-speed drive in a conventional manner. On the lower end of transfer shaft 60 is a bevel gear assembly 64 having a lower bevel gear 66 and an upper bevel gear 68 rotatable about said transfer shaft as a unit. The lower bevel gear 66 is engaged by a driving bevel gear 69 on drive shaft 40, the lower end of gear assembly 64 having a clutch plate 70 coaxial with transfer shaft 60. On the lower end of transfer shaft 60 is a thrust plate 72 which is engaged with clutch plate 70 by a clutch linkage 74 to provide a driving connection between engine 38 and rotor 18. The upper bevel gear 68 engages a bevel gear 76 fixed to an extension shaft 78 which extends rearwardly to drive unit 34.

Below rotor hub 20 is a non-rotating guide ring 80 connected to an actuating rod 82, said guide ring acting in the manner of a swash plate to tilt the axis of rotor 18 relative to shaft 46, but without affecting the rotor blade action which is a separate function.

Propeller Drive System

The extension shaft 78 enters the drive unit 34, illustrated in FIGURES 5 and 6, is fitted with a bevel gear 84 which engages a further bevel gear 86 on a splined vertical shaft 88. A clutch 90 may be installed in extension shaft 78 if desired. The upper portion of drive unit 34 comprises a head 92 having a sleeve portion 94 which is rotatable about a vertical axis, coaxial with shaft 88, in the fixed lower barrel portion 96 of the drive unit. The upper end of head 92 is supported by a bearing 98 on the fixed fin structure, indicated at 100. In the head 92 is an internally splined shaft 102 fitting over shaft 88 and having at its upper end a bevel gear 104 which engages a bevel gear 106 fixed to the propeller shaft 32.

The sleeve portion 94 has an arcuate toothed rack section 108 engaged by a pinion 110 on a small actuating motor 112 mounted on the drive unit 34. By this means the head 92 can be swung, with propeller 30, through an angle of 90 degrees about the axis of shaft 88.

Within the propeller shaft 32, which is a hollow tubular member, is a push rod 114 on the rear end of which is a freely rotatable sleeve 116 carrying radial arms 118, the ends of which are coupled by links 120 to the propeller blades 122. By axial movement of push rod 114 the blade pitch angle can be varied, the general arrangement being well known. On the forward end of push rod 114 extending from head 92 is a fork 124 having opposed guide pins 126 which ride in the slotted tracks 128 of an arcuate cam 130. The cam 130 extends over an arc of substantially 90 degrees and comprises an inner portion 132 and an outer portion 134 pivotally mounted at their junction to swing independently about a vertical hinge pin 136 attached to a fixed bracket 138, as in FIGURE 7. The center of radius of cam 130 is coaxial with shaft 88 so that, as head 92 swings, the fork 124 will slide around the cam tracks 128. The inner cam portion 132 is connected to a pitch change rod 140 extending to a suitable pilot actuated control, not shown. The outer cam portion 134 has a bellcrank arm 142 from which a connecting rod 144 is attached to rudder horn 26, so that rudder movement also causes swinging of said outer cam portion, as indicated in broken line in FIGURE 5.

*Operation*

The convertiplane can be operated in the manner of a helicopter for vertical take-off by applying power to the rotor 18. The gears 52 and 56 are engaged in the high speed position, as in FIGURE 8, the thrust plate 72 being in driving engagement with clutch plate 70. Propeller 30 is turned to the side of fin 22 by rotating head 92, so that said propeller acts as an anti-torque rotor, this position being indicated in broken line in FIGURES 3 and 4. In this position the fork 124 will be at the end of outer cam portion 134. Thus movement of the rudder, as for yaw control, will move connecting rod 144 and swing the cam portion 134 about hinge pin 136, so shifting push rod 114 and varying the pitch of propeller blades 122. The varying torque of the propeller 30 provides yaw control in vertical or hovering flight when the rudder is ineffective, but is controlled in an instinctive manner by the conventional rudder controls, not shown. While in this position, the pitch of blades 122 cannot be changed by pitch control rod 140, so avoiding over-riding of the yaw control action.

Figure 3:
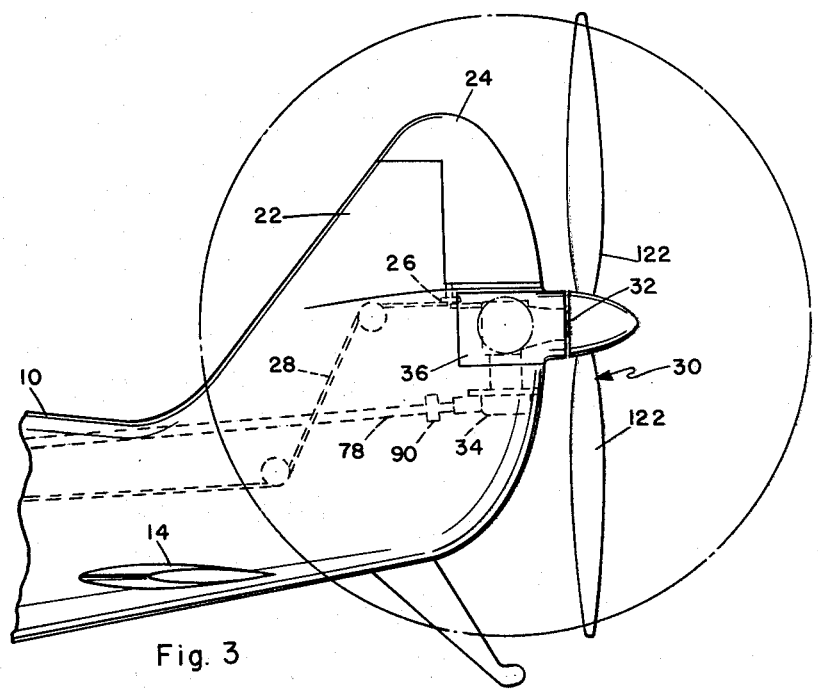
FIGURE 3 is an enlarged side elevation view of the tail assembly.
Figure 4:
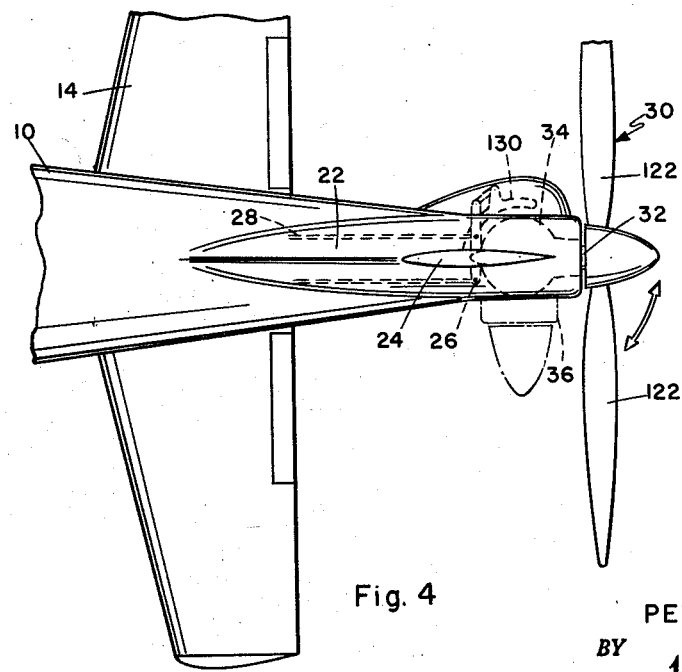
FIGURE 4 is a top plan view of the structure of FIGURE 3.

In transition to forward flight the propeller 30 is swung around to the rear of fin 22, by actuating motor 112, to the position indicated in full line in FIGURES 3–5, so providing forward propulsion. The fork 124 is now in the inner cam portion 132 and is no longer affected by rudder action, but only by movement of pitch change rod 140. During the swinging of propeller 30 from the side to rear position, the coupling of the propeller pitch change mechanism to the rudder will be gradually reduced in effectiveness until fork 124 passes hinge pin 136. When sufficient speed is attained for wings 12 to be contributing sufficient lift to support the aircraft, the thrust plate 72 is disengaged momentarily and gear shift linkage 62 is operated to move gears 54 and 58 into engagement, for low speed rotation of rotor 18 when said thrust plate is re-engaged. Blade pitch angle of rotor 18 is then reduced to zero lift position by conventional helicopter type means, not shown, and the rotor is tilted by actuating rod 82 to incline the plane of the rotor disc relative to airflow, so that lift is minimized as much as is practical. The rotor 18 is thus virtually unloaded in forward flight and will not autorotate. In fact power is applied to the rotor continuously to turn the rotor at such a speed relative to the aircraf forward speed that drag is minimized. The power requirement for tis is very low, allowing the major portion of available power to be applied to propeller 30 for maximum forward speed. The specific rotation speed and angle of inclination of rotor 18 in forward flight will depend on the performance and flying attitude of the particular aircraft, the gearing and controls being arranged to suit.

For heavily loaded aircraft where fully vertical takeoff in the manner of a helicopter is impractical, the rotor 18 may be driven to provide lift while propeller 30 is directed rearwardly for a rolling take-off. Rotor 18 and wings 12 both provide lift until sufficient forward speed is attained, when the rotor is shifted to the unloaded condition.

For landing, forward speed is reduced and rotor 18 is moved to lift position and shifted to high speed, while propeller 30 is swung to the side. The aircraft can then be landed in the manner of a helicopter.

In the event of engine failure in flight, the coupling of propeller 30 and rotor 18, through gear box 44, with clutch 42 disengaged, will allow the windmilling propeller to drive the rotor sufficiently to provide lift and reduce the rate of descent. As long as forward speed is maintained propeller 30 will be driven by air flow, thus the system has very desirable fail-safe characteristics.

The small wings needed to sustain the aircraft in forward flight provide a considerable saving in weight compared to conventional aircraft. Thus the addition of the rotor system does not add unduly to the total weight and provides vertical take-off and landing capability. Further, the power requirement is not as great as that of a helicopter since the rotor is unloaded in forward flight and drag is minimized by a slight application of power to the rotor.

It is understood that minor variation from the form of the invention disclosed herein may be made without departure from the spirit and scope of the invention, and that the specification and drawings are to be considered as merely illustrative rather than limiting.

I claim:
1. In a convertiplane:
an airframe having fixed wing structure;
a lifting rotor rotatably mounted on top of said airframe;
forward thrust producing means operably mounted on said airframe;
a motor;
drive means connected between said motor and said rotor to drive said rotor at one speed to provide a substantial portion of the total lift of the convertiplane;
and speed changing means in said drive means operable to drive said rotor at another, reduced speed, just fast enough to minimize drag, during forward flight of the convertiplane when said forward thrust producing means is operated.

2. In a convertiplane:
an airframe having fixed wing structure;
a lifting rotor rotatably mounted on top of said airframe;
forward thrust producing means operably mounted on said airframe;
a motor;
drive means connected between said motor and said rotor to drive said rotor at one speed to provide a substantial portion of the total lift of the convertiplane;

speed changing means in said drive means operable to drive said rotor at another, reduced speed, just fast enough to minimize drag, during forward flight of the convertiplane when said forward thrust producing means is operated;

and means to incline said rotor relative to airflow in forward flight to minimize drag and lift.

3. A convertiplane, comprising:

an airframe;

a lifting rotor rotatably mounted above said airframe;

means to drive said rotor at one speed to provide a substantial portion of the total lift of the convertiplane;

means to drive said rotor at another, reduced speed;

means to incline said rotor relative to airflow in forward flight to minimize drag and lift when the rotor is driven at reduced speed;

continuously driven thrust producing means at the rear of said airframe;

and means to swing said thrust producing means, whereby the direction of thrust is changed between a direction rearwardly of the airframe and a direction laterally of the airframe.

4. A convertiplane, comprising:

an airframe;

a lifting rotor rotatably mounted above said airframe;

means to drive said rotor at one speed to provide a substantial portion of the total lift of the convertiplane;

means to drive said rotor at another, reduced speed;

means to incline said rotor relative to airflow in forward flight to minimize drag and lift;

thrust producing means at the rear of said airframe;

means to swing said thrust producing means between a first position rearwardly of said airframe and a second position at one side of the airframe;

yaw control means;

coupling means between said yaw control means and said thrust producing means to vary the thrust in accordance with yaw control action;

said coupling means having progressively decreasing action as said thrust producing means swings from said second position to said first position.

5. A convertiplane, comprising:

a lifting rotor rotatably mounted above said airframe;

means to drive said rotor at one speed to provide a substantial portion of the total lift of the convertiplane;

means to drive said rotor at another, reduced speed;

means to incline said rotor relative to airflow in forward flight to minimize drag and lift;

a continuously driven thrust producing propeller mounted at the rear of said airframe;

said propeller being pivotally mounted to swing between a first position rearwardly of said airframe and a second position at one side of the airframe.

6. A convertiplane, comprising:

a lifting rotor rotatably mounted above said airframe;

means to drive said rotor at one speed to provide a substantial portion of the total lift of the convertiplane;

means to drive said rotor at another, reduced speed;

means to incline said rotor relative to airflow in forward flight to minimize drag and lift;

a continuously driven thrust producing propeller mounted at the rear of said airframe;

said propeller being pivotally mounted to swing between a first position rearwardly of said airframe and a second position at one side of the airframe;

pitch control means connected to said propeller and being variable in said first and second positions and during transition therebetween.

7. A convertiplane, comprising:

a lifting rotor rotatably mounted above said airframe;

means to drive said rotor at one speed to provide a substantial portion of the total lift of the convertiplane;

means to drive said rotor at another, reduced speed;

means to incline said rotor relative to airflow in forward flight to minimize drag and lift;

a continuously driven thrust producing propeller mounted at the rear of said airframe;

said propeller being pivotally mounted to swing between a first position rearwardly of said airframe and a second position at one side of the airframe;

pitch control means connected to said propeller and being variable in said first and second positions and during transition therebetween;

a cam having an inner portion and an outer portion;

said pitch control means being engageable with said inner portion in said first position and engageable with said outer portion in said second position;

pitch actuating means coupled to said inner portion;

and yaw control means coupled to said outer portion, whereby the pitch of said propeller is varied in accordance with yaw control action in said second position.

References Cited by the Examiner

UNITED STATES PATENTS

| | | | |
|---|---|---|---|
| 2,478,847 | 8/49 | Stuart | 244—7 |
| 2,959,373 | 11/60 | Zuck | 244—7.3 |
| 3,105,659 | 10/63 | Stutz | 244—7 |

FERGUS S. MIDDLETON, *Primary Examiner.*